(12) United States Patent
Venkataraman et al.

(10) Patent No.: US 10,277,952 B2
(45) Date of Patent: *Apr. 30, 2019

(54) METHOD AND SYSTEM FOR PERFORMING SEARCHES FOR TELEVISION CONTENT USING REDUCED TEXT INPUT

(71) Applicant: Veveo, Inc., Andover, MA (US)

(72) Inventors: Sashikumar Venkataraman, Andover, MA (US); Rakesh Barve, Bangalore (IN); Pranav Rajanala, Bangalore (IN); Rahul Agrawal, Bhopal (IN); Murali Aravamudan, Andover, MA (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/833,710

(22) Filed: Aug. 24, 2015

(65) Prior Publication Data

US 2016/0057503 A1 Feb. 25, 2016

Related U.S. Application Data

(63) Continuation of application No. 13/006,846, filed on Jan. 14, 2011, now Pat. No. 9,135,337, which is a
(Continued)

(51) Int. Cl.
*H04N 21/482* (2011.01)
*G06F 17/30* (2006.01)
(Continued)

(52) U.S. Cl.
CPC ... *H04N 21/4828* (2013.01); *G06F 17/30625* (2013.01); *G06F 17/30817* (2013.01);
(Continued)

(58) Field of Classification Search
CPC ........ G06F 17/30625; G06F 17/30817; H04N 21/482; H04N 7/163; H04N 5/44543; H04N 21/14828
See application file for complete search history.

(56) References Cited

U.S. PATENT DOCUMENTS 5,805,155 A * 9/1998 Allibhoy ............ H04N 7/17318
                                                348/E5.108
5,912,664 A * 6/1999 Eick ................... H04N 5/44543
                                                348/E5.105
(Continued)

FOREIGN PATENT DOCUMENTS

WO WO-2004068256 A2 8/2004

OTHER PUBLICATIONS

Rovi Guides et al. v. Comcast Corp. et al, Case No. 2:16-CV-321, Complaint for Patent Infringement, dated Apr. 1, 2016, 174 pages.
(Continued)

*Primary Examiner* — Daniel A Kuddus
(74) *Attorney, Agent, or Firm* — Haley Guiliano LLP (57) ABSTRACT

A method and system are provided for identifying a television content item desired by a television viewer from a set of television content items. Each of the television content items has one or more associated descriptors. The system receives from the television viewer a reduced text search entry directed at identifying the desired television content item. The search entry is a prefix substring of one or more words relating to the desired television content item. The system dynamically identifies a group of one or more television content items from the set of television content items having one or more descriptors matching the search entry as the television viewer enters each character of the search entry. The system then transmits the names of the one or more television content items of the identified group to he displayed on a device operated by the television viewer.

18 Claims, 8 Drawing Sheets

Related U.S. Application Data continuation of application No. 11/136,261, filed on May 24, 2005, now Pat. No. 7,895,218.

(60) Provisional application No. 60/664,879, filed on Mar. 24, 2005, provisional application No. 60/626,274, filed on Nov. 9, 2004.

(51) Int. Cl.
*H04N 5/445* (2011.01)
*H04N 7/16* (2011.01)
*H04N 21/422* (2011.01)

(52) U.S. Cl.
CPC ......... *H04N 5/44543* (2013.01); *H04N 7/163* (2013.01); *H04N 21/42204* (2013.01); *H04N 21/482* (2013.01)

(56) References Cited

U.S. PATENT DOCUMENTS

| | | | | |
|---|---|---|---|---|
| 6,664,980 | B2* | 12/2003 | Bryan | G06F 17/30994 707/E17.142 |
| 7,599,914 | B2* | 10/2009 | Patterson | G06F 17/30613 |
| 2001/0027562 | A1 | 10/2001 | Schein et al. | |
| 2002/0184373 | A1* | 12/2002 | Maes | G10L 15/30 709/228 |
| 2003/0005452 | A1* | 1/2003 | Rodriguez | H04N 7/08 725/86 |
| 2003/0005462 | A1* | 1/2003 | Broadus | H04N 7/147 725/110 |
| 2003/0014753 | A1* | 1/2003 | Beach | H04N 5/44543 725/53 |
| 2003/0026268 | A1* | 2/2003 | Navas | H04L 29/12009 370/400 |
| 2003/0084270 | A1* | 5/2003 | Coon | C10G 1/00 712/204 |
| 2003/0226146 | A1* | 12/2003 | Thurston | H04N 5/44543 725/46 |
| 2004/0083198 | A1* | 4/2004 | Bradford | G06F 3/0236 |
| 2004/0129091 | A1* | 7/2004 | Duret | B62D 1/16 73/862.328 |
| 2004/0143569 | A1* | 7/2004 | Gross | G06F 17/30398 |
| 2004/0194141 | A1* | 9/2004 | Sanders | G06F 17/30817 725/53 |
| 2004/0220926 | A1* | 11/2004 | Lamkin | G06F 17/30017 |
| 2004/0221308 | A1* | 11/2004 | Cuttner | H04N 5/44543 725/46 |
| 2005/0192944 | A1* | 9/2005 | Flinchem | G06F 17/30389 |
| 2005/0256311 | A1* | 11/2005 | Newcombe | C07D 403/04 544/330 |
| 2005/0278175 | A1* | 12/2005 | Hyvonen | G06F 17/30985 704/242 |
| 2006/0010477 | A1* | 1/2006 | Yu | H04N 7/17318 725/87 |
| 2006/0036640 | A1* | 2/2006 | Tateno | G06F 17/30997 |
| 2006/0090185 | A1* | 4/2006 | Zito | G06F 17/30035 725/46 |
| 2009/0119289 | A1* | 5/2009 | Gibbs | G06F 17/3064 |
| 2010/0138868 | A1 | 6/2010 | Sie et al. | |
| 2013/0166581 | A1* | 6/2013 | Teicher | G06F 3/01 707/758 |

OTHER PUBLICATIONS

*Comcast Corporation et al.*, v. *Rovi Corporation et al.* (Civil Action No. 16-cv-3852, Southern District of New York), "Complaint," dated May 23, 2016 (42 pages).

*Comcast Corporation et al.*, v. *Rovi Corporation et al.* (Civil Action No. 16-cv-3852, Southern District of New York), "Amended Complaint," dated May 26, 2016 (42 pages).

*Rovi Guides, Inc. et al.* v. *Comcast Corporation et al.* (Case No. 2:16-cv-321, Eastern District of Texas Marshall Division), "First Amended Complaint for Patent Infringement," dated Apr. 25, 2016 (178 pages).

*Rovi Guides, Inc. et al.* v. *Comcast Corporation et al.* (Case No. 2:16-cv-321, Eastern District of Texas Marshall Division), "Comcast Defendants' Answer to First Amended Complaint," dated Jun. 3, 2016 (91 pages).

*Rovi Guides, Inc. et al.* v. *Comcast Corporation et al.* (Case No. 2:16-cv-321, Eastern District of Texas Marshall Division), "Arris Defendants' Answer to First Amended Complaint," dated Jun. 3, 2016 (71 pages).

*Rovi Guides, Inc. et al.* v. *Comcast Corporation et al.* (Case No. 2:16-cv-321, Eastern District of Texas Marshall Division), "Defendant Technicolor USA, Inc.'s and Technicolor Connected Home USA LLC's Answer and Defenses to Plaintiff's First Amended Complaint," dated Jun. 3, 2016 (205 pages).

*Rovi Guides, Inc. et al.* v. *Comcast Corporation et al.* (Case No. 2:16-cv-321, Eastern District of Texas Marshall Division), "Joint Stipulated Motion for Dismissal of Plaintiff's Claims Against Technicolor SA," dated Aug. 3, 2016 (314 pages).

*Rovi Guides, Inc. et al.* v. *Comcast Corporation et al.* (Case No. 2:16-cv-321, Eastern District of Texas Marshall Division), "Exhibit E.1—Claim Chart for Infringement of U.S. Pat. No. 7,895,218" dated Jun. 16, 2016 (34 pages).

*Rovi Guides, Inc. et al.* v. *Comcast Corporation et al.* (Case No. 2:16-cv-321, Eastern District of Texas Marshall Division), "Exhibit E—Claim Chart for Infringement of U.S. Pat. No. 7,895,218" dated Jun. 16, 2016 (34 pages).

*Rovi Guides, Inc. et al.* v. *Comcast Corporation et al.* (Case No. 2:16-cv-321, Eastern District of Texas Marshall Division), "Disclosure of Asserted Claims and Infringement Contentions," dated Jun. 16, 2016 (5 pages).

* cited by examiner

NameSpace 301 = { Name$_1$, Name$_2$, Name$_3$,... Name$_N$};

Name 302 = { Word$_1$, Word$_2$, Word$_3$,... Word$_N$}

Examples: 303
"Casablanca"        - one-word name instance from an ordered name space (movies)
"Malkovich"         - one-word name instance from an unordered name space (cast names)
"Guns of Navarone" - three-word name instance from an ordered name space (movie)
"John Doe"           - two-word name instance from an unordered name space (phone book)

METHOD AND SYSTEM FOR PERFORMING SEARCHES FOR TELEVISION CONTENT USING REDUCED TEXT INPUT

RELATED APPLICATIONS

The present application claims priority under 35 U.S.C. § 120 to U.S. patent application Ser. No. 13/006,846, filed Jan. 14, 2011, currently pending, which is a continuation of U.S. patent application Ser. No. 11/136,261, filed May 24, 2005 and entitled "Method and System for Performing Searches for Television Content Using Reduced Text Input." U.S. patent application Ser. No. 11/136,261 in turn claims priority under 35 U.S.C. § 119(e) to U.S. Provisional Application No. 60/626,274, filed Nov. 9, 2004 and entitled "Television Systems and Associated Methods." U.S. patent application Ser. No. 11/136,261 also claims priority under 35 U.S.C. § 119(e) to U.S. Provisional Application No. 60/664,879, filed Mar. 24, 2005 and entitled "Method and System for Performing Searches for Television Programming Using Reduced Text Input." Each of the foregoing applications is incorporated herein by reference in its entirety.

BACKGROUND OF THE INVENTION

Field of Invention

The present invention generally relates to a method and system for performing searches for television content and, more particularly, to a method and system for performing searches with text entry by a user reduced to prefix substrings representing elements of a namespace containing a set of names composed of one or more words that are either ordered or unordered.

Description of Related Art

Search engines have become increasingly important for finding needed information on the Internet using Personal Computers (PCs). While performing searches is predominantly a PC based activity to date, searching has begun percolating to non-PC domains such as televisions and hand-held devices, as content choices for these domains proliferate. Text input continues to be the primary input technique for search engines since speech input and other input technologies have not sufficiently matured. Though progress has been made recently for PCs with full QWERTY keyboards to reduce the amount of text input needed to arrive at a desired result, the search input process is still grossly deficient and cumbersome when it comes to searching for desired information or content on a large ten-foot interface television environment or a hand-held device. In these usage scenarios, the text input is ordinarily made using keys that are typically overloaded with multiple characters. Of the various device interactions (key stroke, scroll, selection etc.) during a search process in these non-PC systems, text input remains a dominant factor in determining the usability of search. This usability criterion typically constrains text input to a single keyword (such as a name) or a few keywords to describe the item that is being searched. Rich text input such as "natural language input" is generally precluded in the non-PC systems not by the limitations of search engines, but by the difficulty of entering text.

A useful usage scenario for searching in these limited input capability environments could be to find information on a keyword a user has in mind, where the keyword could be the name of a person, place, object, media entity etc. Examples of such a search could be finding the movie "Guns of Navarone" (which as further described below can be considered a three-word name instance from an ordered name space), and "John Doe" (a two-word name instance from an unordered name space). An interesting property of certain search domains is that the percentage of names in the search domain with two or more words is quite significant. For instance, in the case of searching for a person's name (e.g., John Doe) in a phone database, the search domain name size (number of words constituting a name—2 in the case of John Doe) is at least two. In the movie space, a random sampling of 150,000 English movie titles revealed that 86% of the titles have name size greater than or equal to two, even with the removal of some of the most frequently occurring "article stop words" such as "a", "an", and "the."

It would be desirable for search engines for devices (with limited input capabilities in particular) to enable user to get to desired results with reduced input representing a namespace. In particular, a search method or system able to perform one or more of the following would be desirable:

(1) Captures information from one or more words making up a name, using a reduced number of characters to represent the original name. The number of results matched for the name entry is preferably limited to a given threshold, which can, e.g., be determined by the display space for rendering the results and the ease of scrolling through the results.

(2) Allows users to enter words in the namespace in any order. For example, a person lookup search such as "John Doe" should be possible either as "John Doe or Doe John." In this example, "John" and "Doe" is a two-word instance of a name from an unordered namespace.

(3) Facilitates learning of an efficient usage of the reduced text entry scheme intuitively and gradually. First time users should preferably be able to even enter the full string if they choose to. The system preferably provides users with cues and assistance to help learn to key in the reduced string to get to desired results.

(4) Works across search domains with diverse attributes such as (a) size of the search domain (b) the language used for search, (c) the clustering characteristics of names in the search domain, (d) the interface capabilities of the device used for search, and (e) computational power, memory, and bandwidth availability of the search system.

BRIEF SUMMARY OF EMBODIMENTS OF THE INVENTION

In accordance with one or more embodiments of the invention, a method and system are provided for identifying a television content item desired by a television viewer from a set of television content items. Each of the television content items has one or more associated descriptors. The system receives from the television viewer a reduced text search entry directed at identifying the desired television content item. The search entry is a prefix substring of one or more words relating to the desired television content item. The system dynamically identifies a group of one or more television content items from the set of television content items having one or more descriptors matching the search entry as the television viewer enters each character of the search entry. The system then transmits the names of the identified group of one or more television content items to be displayed on a device operated by the television viewer.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a more complete understanding of various embodiments of the present invention, reference is now made to the following descriptions taken in connection with the accompanying drawings in which.

In the figures, like reference numerals refer to generally like elements.

DETAILED DESCRIPTION OF PREFERRED EMBODIMENTS

Briefly, as will be described in further detail below, in accordance with more embodiments of the invention, methods and systems are provided for identifying a television content item desired by a television viewer from a set of available television content items. Such television content items can include a wide variety of video/audio content including, but not limited to, television programs, movies, music videos, video-on-demand, or any other identifiable content that can be selected by a television viewer.

The television viewer can enter into a search device having a text input interface a reduced text search entry directed at identifying the desired television content item. The text can be one or more characters, which can be any alphanumeric character, symbol, space or character separator that can be entered by the user. Each television content item has one or more associated descriptors, particularly names in a namespace relating to the desired television content item. The descriptors specify information about the content, which can include, e.g., information on titles, cast, directors, descriptions, and key words. The names are composed of one or more words that can be either ordered or unordered. The user's search entry comprises one or more prefix substrings that represent a name or names in the namespace. A prefix substring of a word in a name captures information from the word and can be a variable length string that contains fewer than all the characters making up the word.

The system identifies a group of one or more television content items from the set of available television content items having descriptors matching the search entry. The names of the identified group of one or more television content items is then transmitted to and displayed on a device operated by the television viewer. The viewer can then select the desired content item from the group displayed, or enter further characters or edit the substring to narrow or change the results as desired.

The descriptors can include a preferably partial subset of pre-indexed prefix substring combinations. The prefix substrings entered by a user are input to an algorithm that can dynamically generate results leveraging off the pre-indexed prefix substring combinations. The size of the pre-indexed prefix substring combinations can be based on some balance between computational power, memory availability, and optionally bandwidth constraints of the system in which reduced text entry search is deployed.

The variable prefix substring search algorithm can allow multiple names to be entered, preferably without regard to the order. The results list for search is preferably dynamically culled by the text input of each character. The results are preferably ordered based on a relevance function that can be a domain specific combination of, e.g., popularity, temporal relevance, location relevance, personal preferences, and the number of words in the input search string.

One or more embodiments of the present invention also includes a system for intuitively informing and educating the user of the smallest or generally smallest substring for yielding a particular result, thereby empowering the user with a user-friendly search method particularly on platforms with limited text entry capabilities. The flexibility of entering prefix substrings of variable sizes to get to the desired result makes the reduced text entry scheme intuitive and easy to use.

Figure 1:
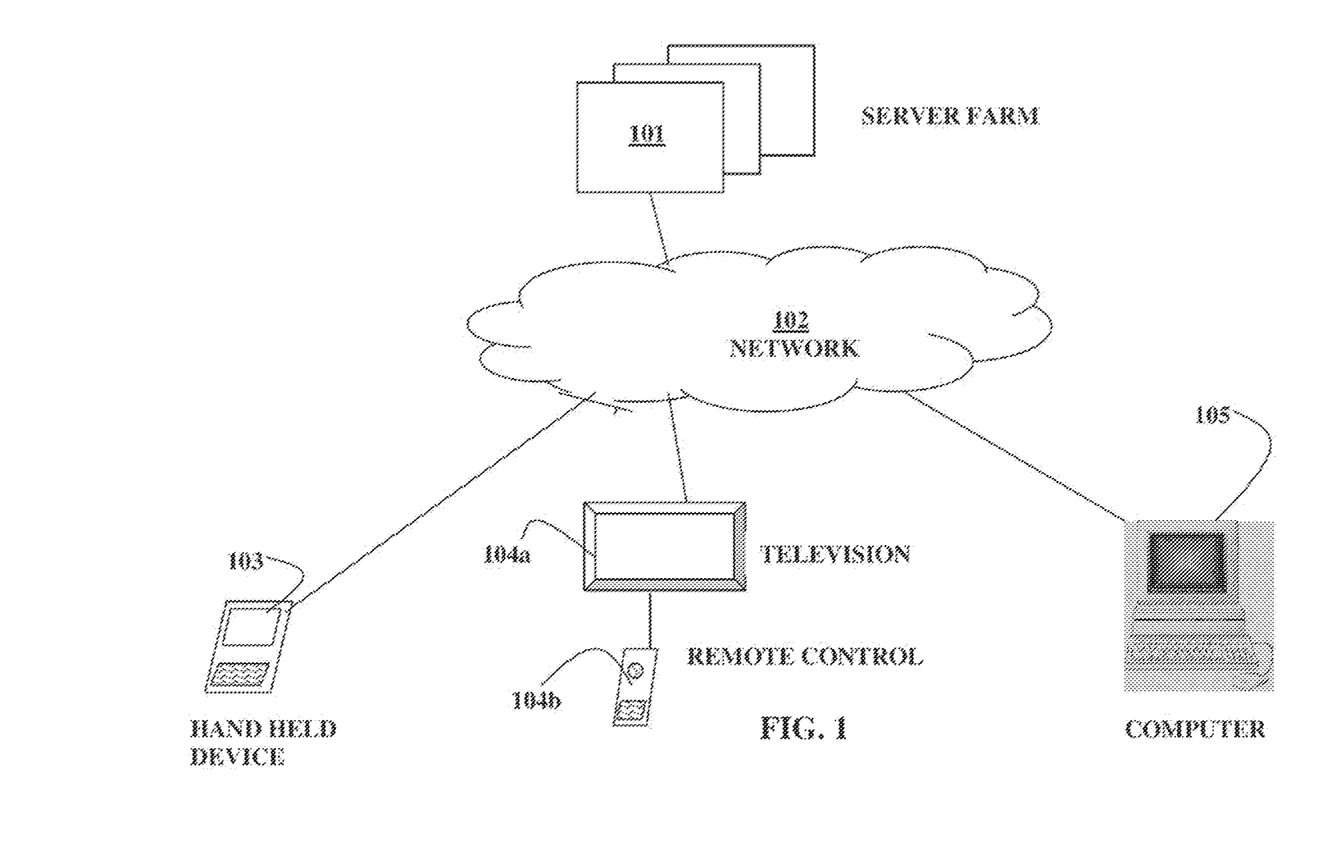
FIG. 1 illustrates a reduced text entry search system in accordance with one or more embodiments of the invention being used in different device and network configurations.

FIG. 1 illustrates an overall system for performing searches with reduced text entry using a wide range of devices in accordance with one or more embodiments of the invention. A server farm 101 can serve as the source of search data and relevance updates with a network 102 functioning as the distribution framework. The distribution framework could be a combination of wired and wireless connections. Examples of possible networks include cable television networks, satellite television networks, and IP-based television networks. The search devices could have a wide range of interface capabilities such as a hand-held device 103 (e.g., a phone or PDA) with limited display size and overloaded or small QWERTY or other keypad, a television 104a coupled with a remote control device 104b having an overloaded or small QWERTY or other keypad, and a Personal Computer (PC) 105 with a full QWERTY or other keyboard and a computer display.

Figure 2:
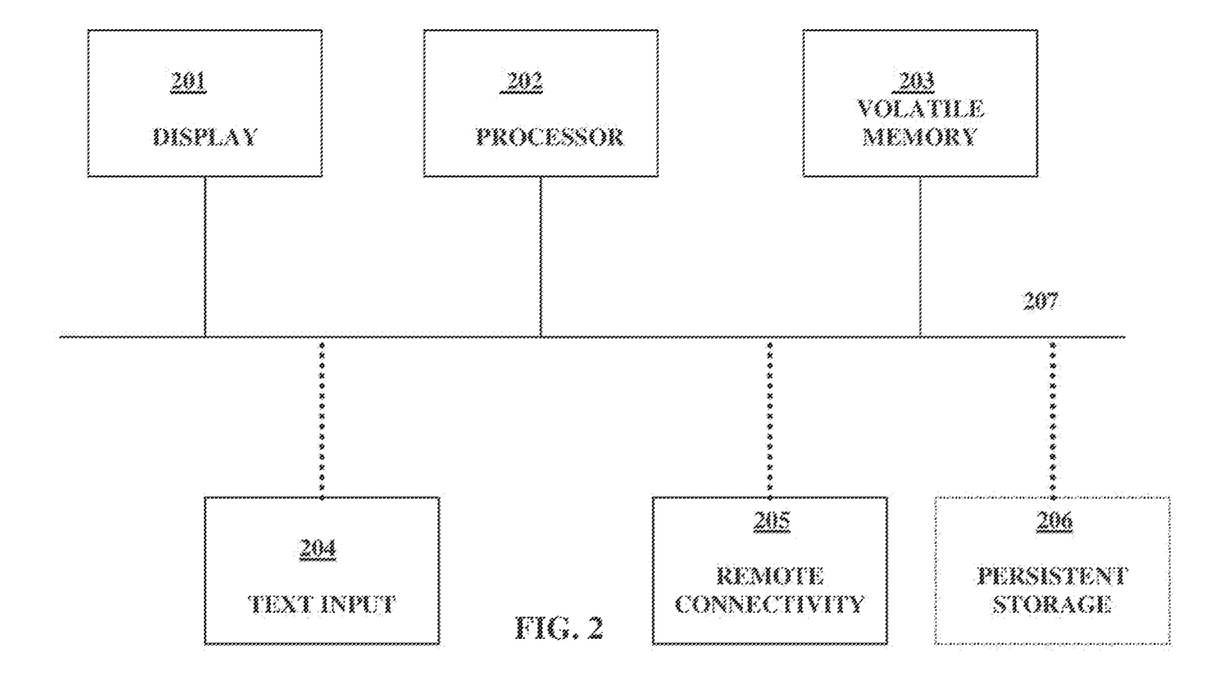
FIG. 2 illustrates configuration options of exemplary devices for performing searches in accordance with one or more embodiments of the invention.

FIG. 2 illustrates multiple exemplary configurations for search devices in accordance with one or more embodiments of the invention. In one configuration, a search device (e.g., PC 105) can have a display 201, a processor 202, volatile memory 203, text input interface 204 (which can be on-device or through a wireless remote control 104b), remote connectivity 205 to the server 101 through the network 102, and a persistent storage 206. A device configuration for a device such as the hand-held device 103 might not include local persistent storage 206. In this case, the device 103 could have remote connectivity 205 to submit the query to the server 101 and retrieve results from it. Another configuration of the device 103 may not have remote connectivity 205. In this case, the search database may be locally resident on a local persistent storage 206. The persistent storage 206 may be, e.g., a removable storage element too such as SD, SmartMedia, CompactFlash card etc. In a configuration of the device with remote connectivity 205 and persistent storage 206 for search (e.g., television 104a), the device may use the remote connectivity for search relevance data update or for the case where the search database is distributed on the local storage 206 and on the server 101. In one or more exemplary embodiments of the invention, a television 104a may have a set-top box with a one-way link to a satellite network. In this configuration, all search data including relevance updates may be downloaded to the device through a satellite link to perform local searching.

Figure 3:
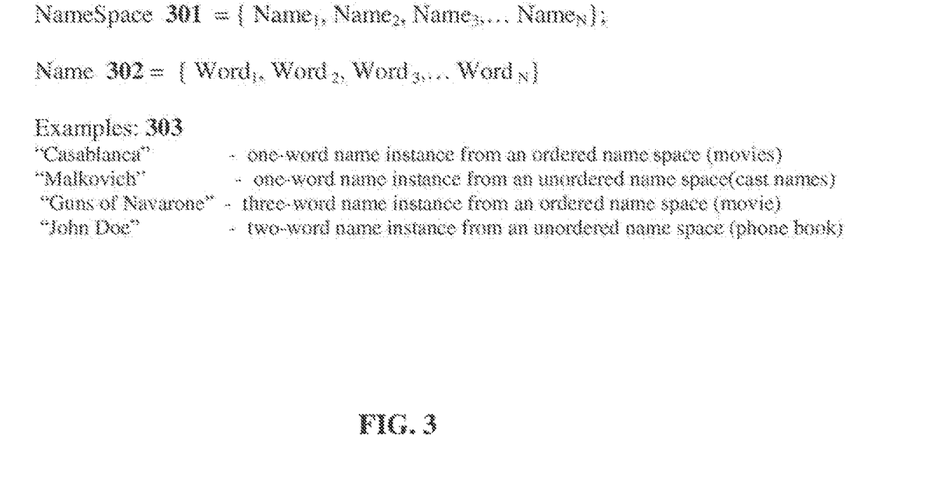
FIG. 3 illustrates examples of a discrete structural composition of text input to a search system in accordance with one or more embodiments of the invention.

FIG. 3 illustrates an exemplary structure of a reduced text entry query for search in accordance with one or more embodiments of the invention. Each query can be composed of one or more words preferably delimited by a separator such as, e.g., a space character or a symbol. Adjacent words of the query may constitute an ordered name, e.g., "Guns of Navarone" or an unordered name, e.g., "John Doe" as illustrated in example 303. Individual words can also be part of a set of ordered or unordered names such as "Malkovich" or "Casablanca," though the ordering attribute is irrelevant in this case. A set of names that is either ordered or unordered constitutes a namespace. An example of an unordered namespace is a phone book with names of people. An example of an ordered namespace is a database of movie titles.

Figure 4:
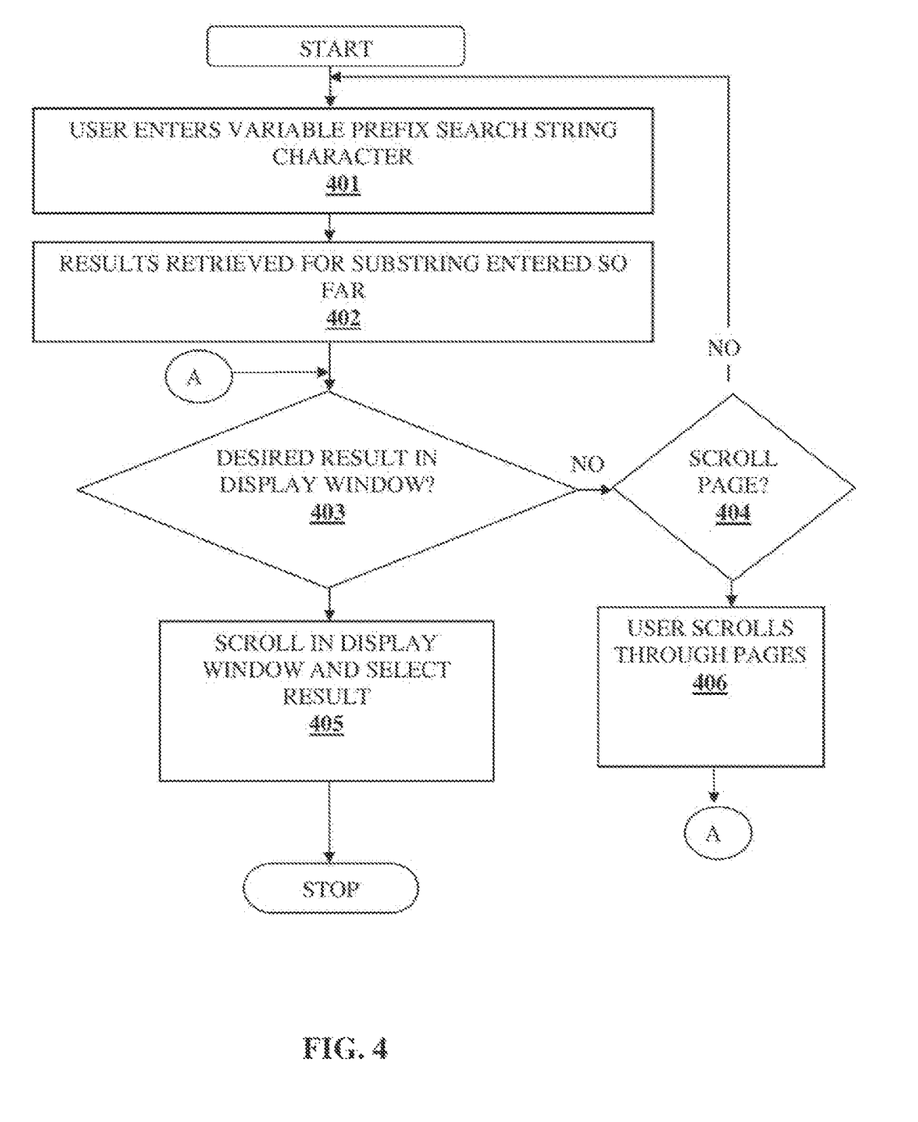
FIG. 4 illustrates a process of user starting a new search and entering text and arriving at a desired result in accordance with one or more embodiments of the invention.

FIG. 4 illustrates an exemplary process of user starting a new search, entering characters and arriving at the desired result in accordance with one or more embodiments of the invention. A user enters one or more search string characters at 401, which could be a variable size prefix of the intended query (e.g., to represent 'Brad Pitt', the user can enter B P, BR P, B PI etc.). Results are then preferably dynamically retrieved for the cumulative substring of characters entered up to that point at 402 and displayed. The user determines at 403 as to whether the desired result is shown in a display window. If the result is displayed in the display window, the user can scroll to the desired result within the display window and select the desired result at 405. If the desired result is the first entry in the display window 405, it can be selected by default obviating the need to scroll through the display window.

The ordering of results in the display window is preferably governed by a relevance function that is a domain specific combination of, e.g., popularity, temporal and location relevance. For example when a user is searching for a restaurant using a phone or Personal Digital Assistant (PDA) with GPS capabilities, then the listings could be ordered in descending order of the most popular restaurants in that area. If the user entered NBA, then the system could list the games in order of temporal relevance such as those in progress or are scheduled to begin in the near future are listed first.

If the desired result is not in the display window at step 403, the user can decide whether or not to scroll through pages of results not currently displayed in the window at 404. If the user decides to scroll through the pages, he or she can scroll down the display window linearly or page by page at 406 to reveal more results. If user does not want to scroll through pages, he or she can enter additional characters at 401 to narrow the results.

In the scenario where user does not reach the result due to misspelling or due to the case of a word whose uniqueness (e.g., Tom Brown, Todd Brown) is embedded in the suffix of a word in the query (as opposed to the prefix), the user would have to either go back to the first word and enter more characters or erase one or more of the typed characters and re-enter characters to reach the desired result. The dynamic update of results for each character entry enables the user to recover from an error during the text entry process itself, in contrast to discovering that no results match after typing the entire text.

Figure 5:
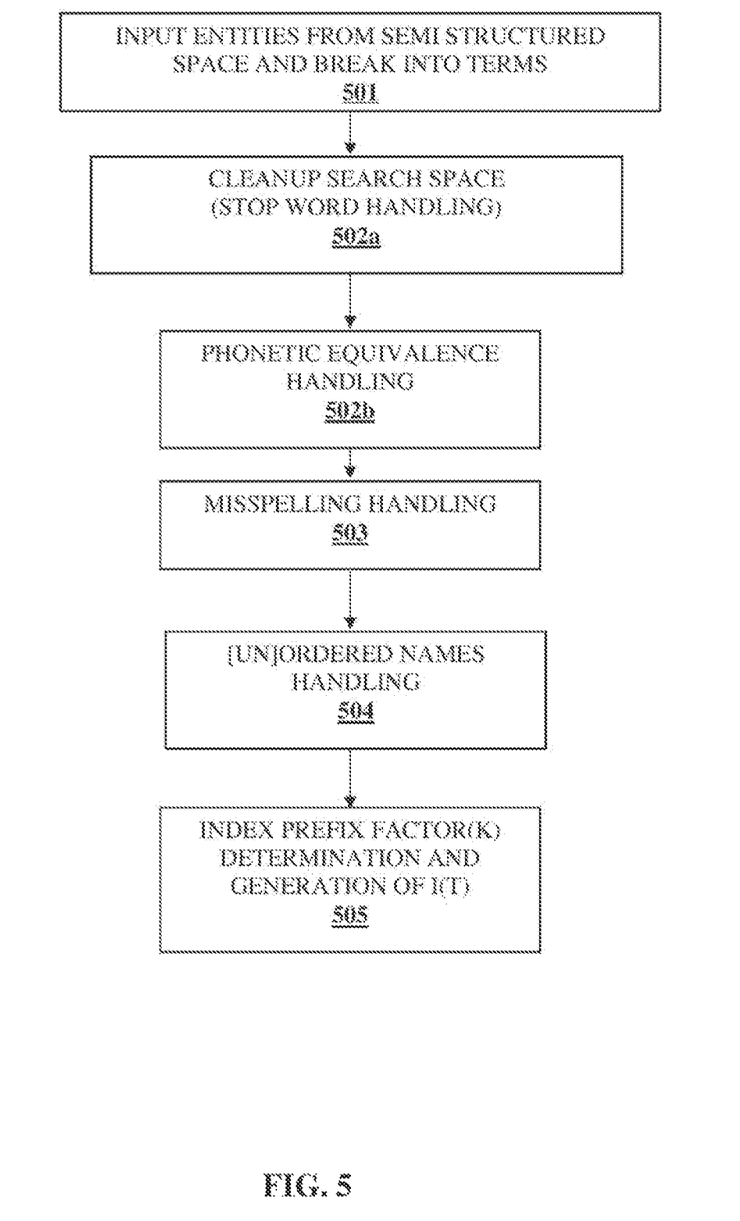
FIG. 5 illustrates a preprocessing step on a search space prior to indexing it in accordance with one or more embodiments of the invention.

FIG. 5 illustrates various steps in a pre-processing phase in accordance with one or more embodiments of the invention. As illustrated in FIG. 3, the input to this phase can be a semi-structured space of any size composed of entities or descriptors (e.g., titles, cast, directors, description, key words) with their metadata values. This semi-structured search space can have a wide range of sizes, e.g., from the size of a PDA phone book to a large subspace obtained by a focused web crawl followed by relevant text processing to derive entities. In scenarios where the search space size is large, it can be possible to organize the space into smaller sub-spaces based on a categorization scheme. The first step 501 is the breakup of entities into terms (e.g., Tom Hanks, Secret Discoveries in Ancient China). A term is a set of ordered or unordered words. In accordance with one or more embodiments of the invention, multiple permutations of the words in the entity may be considered as candidate terms (e.g., Secret Discoveries of Ancient China, Discoveries of Ancient China, Ancient China, China). This allows searching a given entity using variable prefixes of any of the candidate terms. The second step is the cleanup of the entity space at 502a. The cleanup phase involves finding the locations of stop words such as "a", "an", "the". In the next step at 502b, entity names can be duplicated for phonetic equivalence handling (e.g., Jeff and Geoff). The duplication may be either implemented by actually creating multiple variants in data, or tagging for future algorithmic equivalence determination. A misspelling handling step 503 can address typical misspellings committed while entering text. An unordered names handling step 504 can first identify all the ordered and unordered names in a namespace, and then duplicate the unordered names (e.g., John Doe, Doe John). Duplication can involve either data duplication or tagging for algorithmic determination. The steps 501 through 504 determine a set of candidate terms T for each entity. A record is any particular prefix string of a term in T. For example, for the term "guns of navarone", "g o navarone" and "gu of navarone" are two of the many possible records. The set of all possible records of the terms in T is denoted by P(T), and searching for the given item could potentially be accomplished by using any of the prefix in this set.

At step 505, the number of variable prefix strings I(T) that will be pre-computed and stored in the index is determined. In many situations, it is not practical to pre-compute and store all the possible prefixes for all the terms due to expensive memory requirements. One or more embodiments of the present invention accordingly use a flexible method to store only a subset of P(T) based on different parameters such as available memory, computational power, and in some usage scenarios—bandwidth.

While computing I(T), there are a number of terms that are meant to recall entity names. Denote any such term 'T' of length N>=1 as $$T = W_1\_W_2\_W_3\_ \ldots W_N$$

where $W_i$ denotes the $i^{th}$ word and '_' denotes a space (which is an example of a word delimiter)

For any integer 'k', let $W^k$ denote the k-character prefix of word W. If k is greater than length of word W, $W^k = W$. Let W(K) denote the set of words $W^k$ for $1<=k<=K$, where K denotes the upper bound of the size of the prefix. For example, for the word "guns", W(2) consists of prefixes "g" and "gu". For any term T, its corresponding indexed set of I(T,K,C) of bounded multi-word prefix strings can be defined as follows $$I(T,K,C)=\{X_{1\_}X_{2\_}X_{3\_}X_{4\_}X_{5\_}\ldots X_{C\_}W_{C+1\_}\ldots W_N\}$$

Where $X_i \in W_i(K)$ and $W_i$ is the $i^{th}$ word in the term T, and where C denotes the number of words for which prefixes are pre-computed. In a preferred embodiment of the invention, the set I(T,K,C) (also denoted by I(T)) is the set of strings pre-computed on account of term T and tunable parameters K and C. The set I(T) represents the pre-computed records corresponding to the terms in T and is usually a proper subset of P(T). The computation method indexes only the set I(T) as a part of the pre-computation, though the user could input any string in P(T) (which possibly may not belong to I(T)) to efficiently retrieve the term T. This is done by performing some appropriate computation at runtime during the search process leveraging of the set I(T).

The special case of I(T, ∞, ∞) (i.e., K=∞ and C=∞) is the scenario where each record is pre-computed for all the terms in T. In this case I(T) =P(T). It may be impractical to implement this case since the memory requirements would be high even for search spaces of modest size. The case K=0 and C=0, is the scenario where no records are pre-computed, and the search for any term is done dynamically by lookup of all possible terms matching the prefix query. In such a scenario, the runtime costs could be high due to a complete lookup during the search process especially for small prefixes that match with a large number of terms. A practical implementation would choose a value of K and C that is a balance between available memory, computational power and in some usage scenarios bandwidth. For example, a practical implementation may choose K=2 and C=1. In this case for a term "guns of navarone", the pre-computed prefix strings (or records) would be "g_of navarone, gu_of navarone" in addition, to the term "guns of navarone" itself. Though I(T) would in most practical implementations be a proper subset of P(T), the system would dynamically match terms that are not in I(T) (such as gun o nav) leveraging off the set I(T). It may be noted that such queries that are not in I(T) contain at least K initial characters of the first word thereby reducing the potential number of matching terms significantly. These terms may then be collected and analyzed for the matching of the remaining words in the term.

Figure 6:
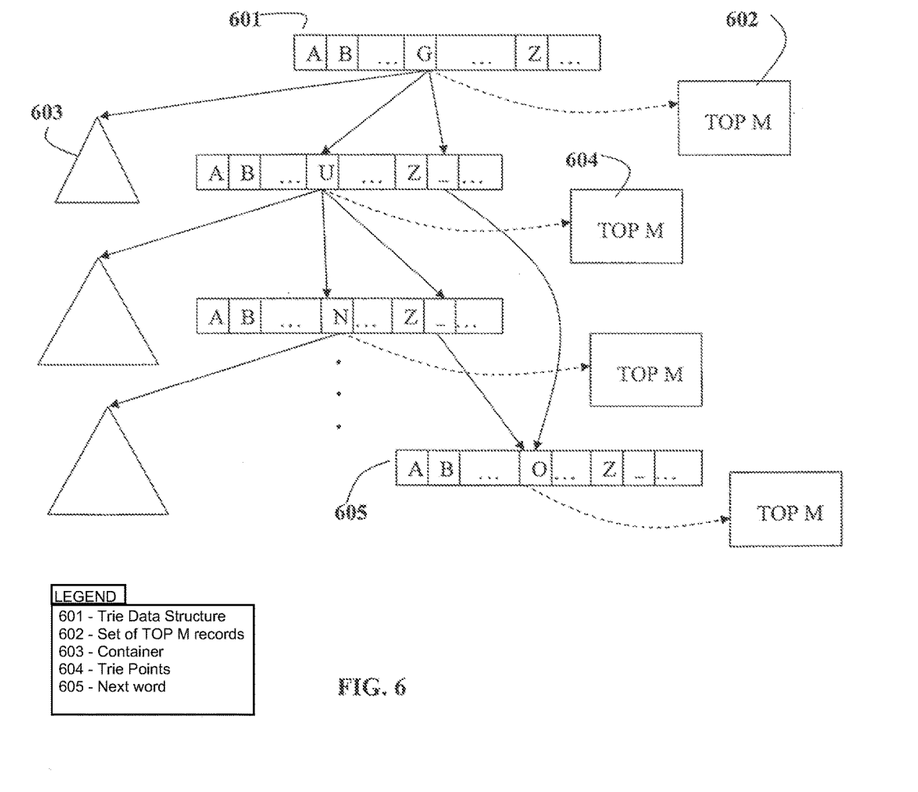
FIG. 6 illustrates an example of a data structure to enable dynamic search leveraging off pre-indexed substring prefixes in accordance with one or more embodiments of the invention.

FIG. 6 illustrates a data structure that enables searching using variable prefix strings. This exemplary illustration shows the case of K=2 and C=1 (although subsequent words in the term are not illustrated). The illustration uses a trie data structure 601 to index the prefix strings. Each character in the trie 604 points to a set of top M 602 records that contains the most popular terms that begin with the prefix corresponding to the path from the root to that character. The ordering could be governed, e.g., by popularity, temporal relevance, location relevance, and personal preference. Single word terms may be selectively given a boost in the ordering in order for it to be discovered quickly since it cannot leverage off the "K" factor or "C" factor. The TOP M records corresponding to every node in the trie may be placed in memory that enables quick access to them. The value of M may be determined by factors such as the display size of the devices from which search would be done and the available memory capacity of the server or client system where the search metadata is stored. Each character in the trie also points to a container 603 that holds all records following the TOP M. For the term "guns of navarone", two new prefix strings in addition to the previous term, are created for the case K=2, "g_of navarone" and "gu_of navarone". The prefix strings "g_" and "gu_" both point to node starting the next word "o" 605.

Figure 7:
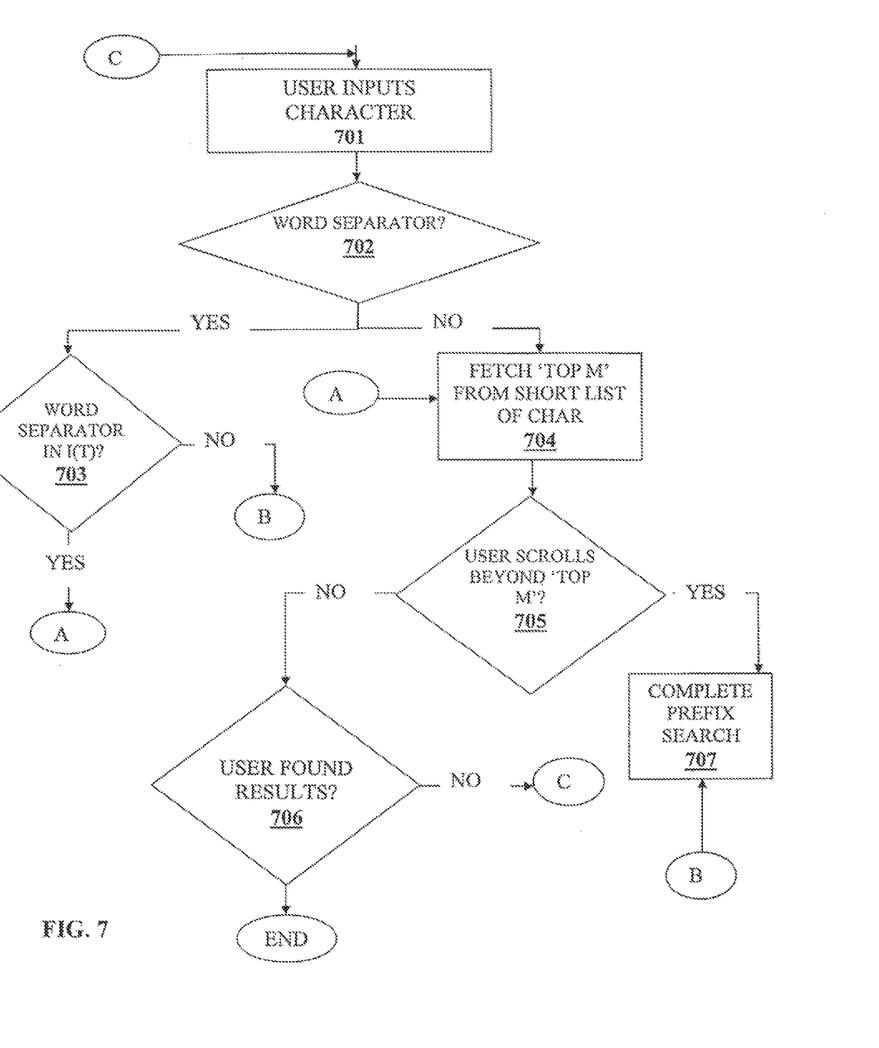
FIG. 7 illustrates internal steps of search as each character is input in accordance with one or more embodiments of the invention.

FIG. 7 illustrates a process of finding results using the variable prefix string scheme in accordance with one or more embodiments of the invention. When user inputs a character of a prefix string at 701, the system examines if it is a word separator at 702. If it is not a word separator, the system fetches the top M records at 704 for that character. If it is a word separator, system examines if the prefix with the word separator is in I(T) at 703. If it is in I(T), the system accesses the top M records for that node in the trie at 704. If the word separator is not in I(T), the system does a complete search at 707 for the records beginning with that prefix string. Also, after step 704, if user scrolls through the results list beyond top M results at 705, the system would perform a complete search at 707. If the user does not scroll beyond the top M results, and the user does not arrive at the result at 706, he can go back and enter another character at 701. So by having just a proper subset I(T) of the prefix strings precomputed, the system can leverage off the pre-computed strings. For example, if user entered "gun_o" for the case K=2, C=1, the system would perform a complete search under strings beginning with gun and generate dynamically the top records that have the second word starting with 'o'. Accordingly, the dynamic search process rides on top of the information provided by the precomputed prefix strings.

Figure 8A:
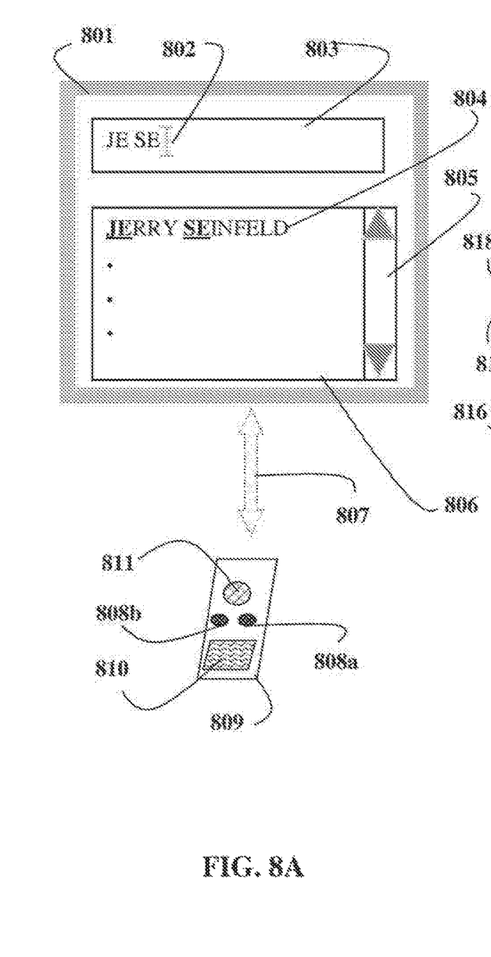
FIGS. 8A and 8B illustrate interface characteristics of two search devices in accordance with one or more embodiments of the invention.

FIGS. 8A and 8B illustrates two exemplary search devices in accordance with one or more further embodiments of the invention. In FIG. 8A, a television 801 is controlled by a remote control device 809 over a wireless connection 807. The device 809 has a keypad 810, a navigation interface 811, a 'next word' button 808a, and a 'previous' button 808b. A preferred interface layout for performing searches is illustrated on the television screen with a permanent text entry focus (which has only one text entry) and decoupled tab focus. This enables user to enter text at any time without having to explicitly switch focus to the text window 803. A results window 806 is displayed with a scroll control 805. The results window 806 can be navigated using the navigation interface 811 on the remote 809. As a user types in "JE SE" at 802, the results window content 804 is dynamically culled to show the results. The remote control 809 has a prominent and easily accessible 'next word' button 808a, that facilitates entry of a space character to delimit words. The 'next word' interface facilitates easy entry of multiple prefix strings. Additionally the remote also has the "previous word" button 808b to facilitate easy traversal to the end of the previous words. This can be used in the remote scenario where the user did not enter sufficient characters for the first 'm' prefixes of a term and has to go back to add more characters if the desired result is not reached.

Figure 8B:
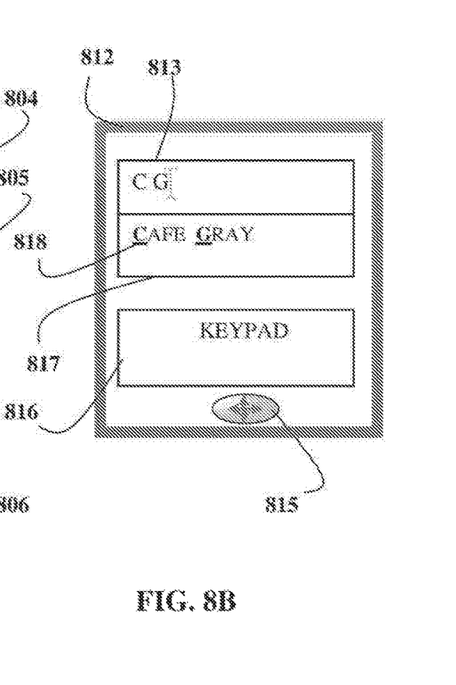

The second device illustrated in FIG. 8B is a hand-held device (e.g., a phone) 812 that has a built-in keypad 816 and navigation interface 815. The display window 813 on this device is likely to be much smaller and hence hold fewer results in a results area 817. Scrolling may be cumbersome on these devices. Aggregation of words can be used wherever applicable to reduce bucket sizes and hence scrolling.

In accordance with one or more embodiments of the invention, the system provides visual cues to users to assist in educating the user on what would be a generally optimal prefix string entry. In the illustrated examples, the visual cues are in the form of underlined prefixes beneath each result 804, 818. The user may over time learn to enter a generally optimal prefix string input due to the visual cues. The optimal prefix string that can display a term within the display space of a device without scrolling can be determined in advance by the system taking into account the number of lines in the display and the relevance factor of the term.

In accordance with one or more embodiments of the invention, entity and term space complexity is considered in designing a search/disambiguating mechanism and operations, in addition to device characteristics themselves. In some cases, in order to apply one or more embodiments of this invention to a given entity/term space, it is useful to appropriately partition the space and have multiple distinct computing engines to serve requests. For example a movie search space could be broken down into smaller search spaces by categorizing them into genres. Similarly a phone book search space can be broken down by categorizing it into cities, and towns. The average size of the hash bucket would set a lower bound on the prefix size. Furthermore, the number of characters to be entered may have to be increased to keep the hash collision count within the tolerable limit of scrolling. For example, in a study done on the movie space, a random sampling of 150,000 English movie titles revealed that 99% of the search space can be covered by 6 characters with hash collisions below 10, while approximately 50% of the search space was covered by a 4 character scheme with a hash collision size below 10. It is interesting to note while the search space was only 150,000 items, it took 6 characters or 300 million buckets to contain the collisions within 10. A study of a restaurant namespace in Westchester, New York with a listing of 1,500 restaurants showed that 98-99% of the restaurants were listed within a display list of top 5 restaurants with the entry of 4 characters, where 2 characters were taken from the first word and two from the next. A study of phonebook namespace for Connecticut State Govt. with 29,500 employees expanded to 58,000 to accommodate for unordered namespace revealed that for a bucket size of 10 and with 4 characters (first word 2 characters and 2 characters from the second word), 62% were listed in the top 10 names. When the number of characters entered increased to 6, 96.5% were listed within the top 10 names.

Methods of identifying content from reduced text input in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method for indexing items for reduced text searching, the method comprising:
   accessing a first name of a plurality of names in a namespace, wherein the first name is associated with words of a first content descriptor corresponding to a first item, and wherein the first name comprises at least two words; and
   prior to receiving input from a user:
   computing a first prefix for a first word of the first name by:
      retrieving a parameter from a storage device, wherein the parameter indicates an upper bound on a size of the first prefix;
      comparing the parameter to the number of characters of the first word to determine whether the parameter is less than the number of characters of the first word;
      in response to determining that the parameter is less than the number of characters of the first word:
         generating a first substring of the first word, wherein the first substring comprises a first letter of the first word, wherein a number of characters of the first substring is less than a number of characters of the first word, and, wherein the number of characters of the first substring is equal to the parameter;
         appending a space character to the first substring that includes the number of characters less than the number of characters in the first word;
         generating a first set of nodes in a data structure for each character in the first substring, wherein each node of the first set is linked in a sequence matching a sequence of the characters of the first sub string; and
         associating each node of the first set with the first item;
   computing a second prefix for a second word of the first name by:
      generating a second substring of the second word, wherein the second substring comprises a first letter of the second word, and wherein a number of characters of the second substring is less than a number of characters of the second word;
      generating a second set of nodes in the data structure for each character in the second substring, wherein each node of the second set is linked in a sequence matching a sequence of the characters of the second substring; and
      associating each node of the second set with the first item; and
   linking a node of the second set corresponding to a first character of the second word with a node of the first set corresponding to the space character.

2. The method of claim 1, wherein generating the second substring of the second word further comprises:
   retrieving a parameter from a storage device, wherein the parameter indicates an upper bound on a number of words in the first name for which to compute a prefix;
   determining whether the parameter is greater than one; and
   in response to determining that the parameter is greater than one, generating the second substring of the second word.

3. The method of claim 1, further comprising:
determining that the first name comprises at least three words;
retrieving a set of stop words from a storage device;
in response to the determining, processing the at least three words to identify a third word matching a stop word of the set of stop words; and
in response to the identifying, removing the third word from the first name.

4. The method of claim 1, wherein the first name is associated with a permutation of the words of the first content descriptor, and wherein the permutation of the words comprises less than all words of the first content descriptor.

5. The method of claim 1, further comprising:
receiving a search string of characters, wherein each character of the search string is associated with one of a first search component, a second search component and a delimiter component, and wherein the first and the second search components are prefix substrings of two words of a second name, and wherein the second name is associated with words of a second content descriptor corresponding to a second item;
comparing each character of search string associated with the first search component to a character associated with each node of the first set to determine whether each character of the first search component matches each character associated with the first set;
in response to determining that each character of the first search component matches each character associated with the first set, comparing each character of the search string associated with the second search component to a character associated with each node of the second set to determine whether each character of the second search component matches each character associated with the second set; and
in response to determining that each character of the second search component matches each character associated with the second set, generating for display the first content descriptor.

6. The method of claim 5, further comprising generating for simultaneous display with the first content descriptor the second content descriptor.

7. The method of claim 6, further comprising:
retrieving an ordering parameter from a storage device, wherein the ordering parameter identifies a characteristic of an item used for determining a ranking of the item;
comparing, based on the ordering parameter, the characteristic of the first item with the characteristic of the second item to determine a relative ranking of the first item and second item; and
generating for simultaneous display the first content descriptor, corresponding to the first item, and the second content descriptor, corresponding to the second item, based on the relative ranking.

8. The method of claim 7, wherein the ordering parameter is based on one of popularity, temporal relevance, location relevance, and personal preference.

9. The method of claim 5, wherein generating for display the first content descriptor further comprises:
generating for display characters of the first content descriptor matching characters of the search string having a visual cue different from characters of the first content descriptor not matching characters of the search string.

10. A system for indexing items for reduced text searching, the system comprising:
a storage device configured to store a first name of a plurality of names in a namespace, wherein the first name is associated with words of a first content descriptor corresponding to a first item, and wherein the first name comprises at least two words, and to store a parameter, wherein the parameter indicates an upper bound on a size of a prefix;
a database configured to store a plurality of nodes in a data structure; and
control circuitry configured to:
prior to receiving input from a user:
retrieve the first name from the storage device;
compute a first prefix for a first word of the first name by:
retrieve the parameter from the storage device;
compare the parameter to the number of characters of the first word to determine whether the parameter is less than the number of characters of the first word;
generate a first substring of the first word, wherein the first substring comprises a first letter of the first word, wherein a number of characters of the first substring is less than a number of characters of the first word, wherein the number of characters of the first substring is equal to the parameter;
append a space character to the first sub string that includes the number of characters less than the number of characters in the first word;
generate a first set of nodes in the data structure for each character in the first substring, wherein each node of the first set is linked in a sequence matching a sequence of the characters of the first substring;
associate each node of the first set with the first item; and
store each node of the first set in the database;
compute a second prefix for a second word of the first name by:
generating a second substring of the second word, wherein the second substring comprises a first letter of the second word, and wherein a number of characters of the second substring is less than a number of characters of the second word;
generating a second set of nodes in the data structure for each character in the second substring, wherein each node of the second set is linked in a sequence matching a sequence of the characters of the second substring;
associating each node of the second set with the first item; and
storing each node of the second set in the database; and
link a node of the second set corresponding to a first character of the second word with a node of the first set corresponding to the space character.

11. The system of claim 10, wherein:
the storage device is further configured to store a parameter, wherein the parameter indicates an upper bound on a number of words in the first name for which to compute a prefix; and
the control circuitry configured to generate the second substring of the second word is further configured to:
retrieve the parameter from the storage device;
determine whether the parameter is greater than one; and in response to determining that the parameter is greater than one, generate the second substring of the second word.

12. The system of claim 10, wherein:
the storage device is further configured to store a set of stop words; and
the control circuitry is further configured to:
  determine that the first name comprises at least three words;
  retrieve the set of stop words from the storage device;
  in response to the determining, process the at least three words to identify a third word matching a stop word of the set of stop words; and
  in response to the identifying, remove the third word from the first name.

13. The system of claim 10, wherein the first name is associated with a permutation of the words of the first content descriptor, and wherein the permutation of the words comprises less than all words of the first content descriptor.

14. The system of claim 10, wherein the control circuitry is further configured to:
  receive a search string of characters, wherein each character of the search string is associated with one of a first search component, a second search component and a delimiter component, and wherein the first and the second search components are prefix substrings of two words of a second name, and wherein the second name is associated with words of a second content descriptor corresponding to a second item;
  retrieve the first set of nodes and the second set of nodes from the database;
  compare each character of search string associated with the first search component to a character associated with each node of the first set to determine whether each character of the first search component matches each character associated with the first set;
  in response to determining that each character of the first search component matches each character associated with the first set, compare each character of the search string associated with the second search component to a character associated with each node of the second set to determine whether each character of the second search component matches each character associated with the second set; and
  in response to determining that each character of the second search component matches each character associated with the second set, generate for display the first content descriptor.

15. The system of claim 14, wherein the control circuitry is further configured to generate for simultaneous display with the first content descriptor the second content descriptor.

16. The system of claim 15, wherein:
the storage device is further configured to store an ordering parameter, wherein the ordering parameter identifies a characteristic of an item used for determining a ranking of the item; and
the control circuitry is further configured to:
  retrieve the ordering parameter from the storage device;
  compare, based on the ordering parameter, the characteristic of the first item with the characteristic of the second item to determine a relative ranking of the first item and second item; and
  generate for simultaneous display the first content descriptor, corresponding to first item, and the second content descriptor, corresponding to the second item, based on the relative ranking.

17. The system of claim 16, wherein the ordering parameter is based on one of popularity, temporal relevance, location relevance, and personal preference.

18. The system of claim 14, wherein the control circuitry configured to generate for display the first content descriptor is further configured to:
  generate for display characters of the first content descriptor matching characters of the search string having a visual cue different from characters of the first content descriptor not matching characters of the search string.

* * * * *